United States Patent
Claros De Luna et al.

(10) Patent No.: US 9,875,020 B2
(45) Date of Patent: Jan. 23, 2018

(54) METHOD FOR CAPTURING USER INPUT FROM A TOUCH SCREEN AND DEVICE HAVING A TOUCH SCREEN

(71) Applicant: KING.COM LIMITED, St. Julians (MT)

(72) Inventors: Fernando Claros De Luna, Barcelona (ES); Patrik Swartz, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 14/798,868

(22) Filed: Jul. 14, 2015

(65) Prior Publication Data

US 2017/0017314 A1 Jan. 19, 2017

(51) Int. Cl.
*G06F 3/0488* (2013.01)

(52) U.S. Cl.
CPC .................. *G06F 3/04883* (2013.01)

(58) Field of Classification Search
CPC ............. G06F 3/04842; G06F 3/04883; G06F 2203/04808; G06F 3/044; G06F 3/041
See application file for complete search history.

(56) References Cited

U.S. PATENT DOCUMENTS

| | | | |
|---|---|---|---|
| 2006/0089198 A1* | 4/2006 | Sawatani | A63F 13/10 463/33 |
| 2006/0217196 A1* | 9/2006 | Kikkawa | A63F 13/10 463/30 |
| 2007/0046647 A1* | 3/2007 | Ohta | G06F 3/0488 345/173 |
| 2013/0063380 A1* | 3/2013 | Wang | G06F 3/04883 345/173 |
| 2014/0007019 A1 | 1/2014 | Saukko et al. | |
| 2014/0038717 A1 | 2/2014 | Lee | |
| 2014/0221088 A1 | 8/2014 | Perez et al. | |
| 2014/0342822 A1* | 11/2014 | Nordenstam | A63F 13/00 463/30 |
| 2015/0026619 A1* | 1/2015 | Lee | G06F 3/0486 715/769 |
| 2015/0094127 A1* | 4/2015 | Canose | A63F 13/42 463/2 |
| 2016/0110092 A1* | 4/2016 | Jeon | G06F 3/04883 345/173 |

FOREIGN PATENT DOCUMENTS

EP 2 383 027 A2 11/2011

OTHER PUBLICATIONS

International Search Report, dated Sep. 19, 2016, and Written Opinion issued in corresponding International Application No. PCT/EP2016/066204.

* cited by examiner

*Primary Examiner* — Md Saiful A Siddiqui

(74) *Attorney, Agent, or Firm* — Saul Ewing Arnstein & Lehr LLP

(57) ABSTRACT

A touch screen device is configured to provide outputs responsive to inputs provided by a user interacting with the touch screen. The outputs are processed by processing circuitry to determine touch locations of consecutive taps. If the latter tap is within a threshold area of the former tap the action performed in response to the former tap is repeated. In the latter tap is not within a threshold area of the subsequent tap, the action performed in response to the former tap is different to the action performed in response to the subsequent tap.

16 Claims, 5 Drawing Sheets

METHOD FOR CAPTURING USER INPUT FROM A TOUCH SCREEN AND DEVICE HAVING A TOUCH SCREEN

FIELD OF THE INVENTION

Some embodiments relate to the use of a touch screen device to capture user input, for example in the context of a computer implemented game.

BACKGROUND OF THE INVENTION

There exist many types of computer device where the display is controlled by an input. The input may be a cursor or pointer that is controlled by a human interface device such as a mouse, joystick, keyboard etc. Increasingly, the display may comprise a touchscreen which can be controlled by a user's touch. That is, activation of functions or objects are responsive to user input made by way of the user touching the screen.

Touch screens may be provided on smaller devices such a smart phones. Interaction with objects displayed on such touch screens can be difficult in that the size of a user's finger is relatively large with respect to the area of the screen where for example an object is displayed. This may lead to a lack of precision when for example playing a computer implemented game on a smart phone.

This patent specification describes not only various ideas and functions, but also their creative expression. A portion of the disclosure of this patent document therefore contains material to which a claim for copyright is made and notice is hereby given: Copyright King.com Limited 2015 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In some embodiments, there is provided a device comprising: a touch screen configured to display an image, said touch screen comprising circuitry configured to provide outputs dependent on inputs provided by a user via said touch screen; at least one processor configured, in dependence on said outputs to determine locations of said inputs and when said inputs comprise a first tap input followed by a second tap input, determining if said second tap input is at a location which is less than a first distance from a location of said first tap input, wherein if it is determined that said second tap input is at a location which is less than said first distance, said at least one processor is configured to cause an action responsive to the first tap input to be carried out, and if it is determined that said second tap input is at a location which is greater than said first distance, said at least one processor is configured to cause a different action to be carried out to that carried out responsive to the first tap input.

The determining if the second tap location is less than the first distance from the first tap location may be carried out in any suitable way. For example, the determination will determine the actual distance between the first and second tap locations. Alternatively, a region will be defined around the first tap location, defining a threshold area and a determination is made as to whether the second tap location is within that threshold area and hence less than the first distance from the first tap location. In other embodiments, any other suitable way of directly or indirectly determining if the second tap location is less than the first distance from the first location may alternatively or additionally be used. This may also be the case with the second and third taps discussed below.

In some embodiments, one of the first and different actions may be to provide no action.

The at least one processor may be configured, when said inputs further comprise a third tap input following said second tap input, determining if said third tap input is at a location which is less than a second distance from a location of said second tap input, wherein if it is determined that said third tap input is at a location which is less than said second distance, said at least one processor is configured to cause an action responsive to the second tap input to be carried out, and if it is determined that said third tap input is at a location which is greater than said second distance, said at least one processor is configure to cause a different action to be carried out to that carried out responsive to the second tap input.

The first and second distances are one of the same and different. For example, the distances may be set to be a constant size. In other embodiments, the distance may be dependent on a direction component and/or the frequency of the taps and/or duration of the taps.

The at least one processor may be configured, to determine if said second tap input is at a location which is less than the first distance from the location of said first tap input, said first distance being dependent on a direction of the second tap with respect to the first tap. In some embodiments, the first distance may vary with direction. This may be if a de facto threshold area around the location is not circular. The threshold area could be regular or irregular in shape.

The at least one processor may be configured, responsive to a tap input to define a threshold area, said device further comprising a memory configured to store information defining said threshold area and responsive to a subsequent tap input, said at least one processor is configured to redefine said threshold area, said memory being configured to store information on said redefined threshold area. In this embodiment, the first distance may be defined in terms of the threshold area.

Each threshold area may be substantially centred on said respective tap input. The at least one processor may be configured to determine if said second tap input is at a location which is less than the first distance from the location of said first tap input by determining if said second tap input is at a location within the threshold area defined with respect to the first tap input.

The at least one processor may be configured to determine if said second tap input is at a location which is less than the first distance from the location of said first tap input by determining the distance between the location of the first tap input and the location of the second tap input. For example, this may be done using coordinates associated with the first tap input and coordinates associated with the second tap input.

At least one processor may be configured to compare said determined distance to said first distance to determine if said second tap input is at a location which is less than the first distance from the location of the first tap input.

The at least one processor is configured to determine time information between said first and second tap inputs, said first distance being dependent on said time information.

The device may be is configured to support a computer implemented game, said touch screen being configured to display a plurality of game objects, said at least one processor configured to cause said action to be performed by at least one game object.

The action may be defined by a first component and a second component, and said different action has at least one different first and second component.

The first component of said action and said different action defines an action and said second component comprises a direction, said direction being different in said action and said different action.

The at least one processor may be configured, in dependence on said outputs to determine locations of said inputs by determining for each input a contact point with respect to said touch screen.

According to an aspect, a touch screen device is configured to provide outputs responsive to inputs provided by a user interacting with the touch screen. The outputs may be processed by processing circuitry to determine touch locations of consecutive taps. If the latter tap is within a threshold area of the former tap the action performed in response to the former tap may be repeated. In the latter tap is not within a threshold area of the subsequent tap, the action performed in response to the former tap may be different to the action performed in response to the subsequent tap.

According to another aspect, there is provided a computer implemented method comprising: displaying an image an image on a touch screen, receiving outputs from touch screen circuitry responsive to inputs provided by a user via said touch screen; processing said outputs to determine locations of said inputs and when said inputs comprise a first tap input followed by a second tap input, determining if said second tap input is at a location which is less than a first distance from a location of said first tap input, wherein if it is determined that said second tap input is at a location which is less than said first distance, causing an action responsive to the first tap input to be carried out, and if it is determined that said second tap input is at a location which is greater than said first distance, causing a different action to be carried out to that carried out responsive to the first tap input.

The method may comprise, when said inputs further comprises a third tap input following said second tap input, determining if said third tap input is at a location which is less than a second distance from a location of said second tap input, wherein if it is determined that said third tap input is at a location which is less than said second distance, the method comprises causing an action carried out responsive to the second tap input to be carried out, and if it is determined that said third tap input is at a location which is greater than said second distance, the method comprises causing a different action to be carried out to that carried out responsive to the second tap input.

The first and second distances may be one of the same and different.

The method may comprise determining if said second tap input is at a location which is less than the first distance from the location of said first tap input, said first distance being dependent on a direction of the second tap with respect to the first tap.

The method may comprise, responsive to a tap input to define a threshold area, storing information defining said threshold area and responsive to a subsequent tap input, redefining said threshold area and storing information on said redefined threshold area.

Each threshold area may be substantially centred on said respective tap input.

The method may comprise determining if said second tap input is at a location which is less than the first distance from the location of said first tap input by determining if said second tap input is at a location within the threshold area defined with respect to the first tap input.

The method may comprise determining if said second tap input is at a location which is less than the first distance from the location of said first tap input by determining the distance between the location of the first tap input and the location of the second tap input.

The method may comprise comparing said determined distance to said first distance to determine if said second tap input is at a location which is less than the first distance from the location of the first tap input.

The method may comprise determining time information between said first and second tap inputs, said first distance being dependent on said time information.

The method may comprise displaying a plurality of game objects of a computer implemented game and causing said action to be performed by at least one game object.

The action may be defined by a first component and a second component, and said different action has at least one different first and second component.

The first component of said action and said different action may define an action and said second component may comprise a direction, said direction being different in said action and said different action.

The method may comprise, in dependence on said outputs determining locations of said inputs by determining for each input a contact point with respect to said touch screen.

A computer program comprising program code means adapted to perform the method(s) may also be provided. The computer program may be stored and/or otherwise embodied by means of a carrier medium.

According to one aspect, there is provided a computer program product for providing a computer implemented game in a touch screen device, said computer program product comprising computer executable code which when run is configured to: cause an image to be displayed on a touch screen; process outputs from touch screen circuitry responsive to inputs provided by a user via said touch screen; determine locations of said inputs from said outputs and when said inputs comprise a first tap input followed by a second tap input, determine if said second tap input is at a location which is less than a first distance from a location of said first tap input, wherein if it is determined that said second tap input is at a location which is less than said first distance, cause an action responsive to the first tap input to be carried out, and if it is determined that said second tap input is at a location which is greater than said first distance, cause a different action to be carried out to that carried out responsive to the first tap input.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF THE INVENTION

Figure 1:
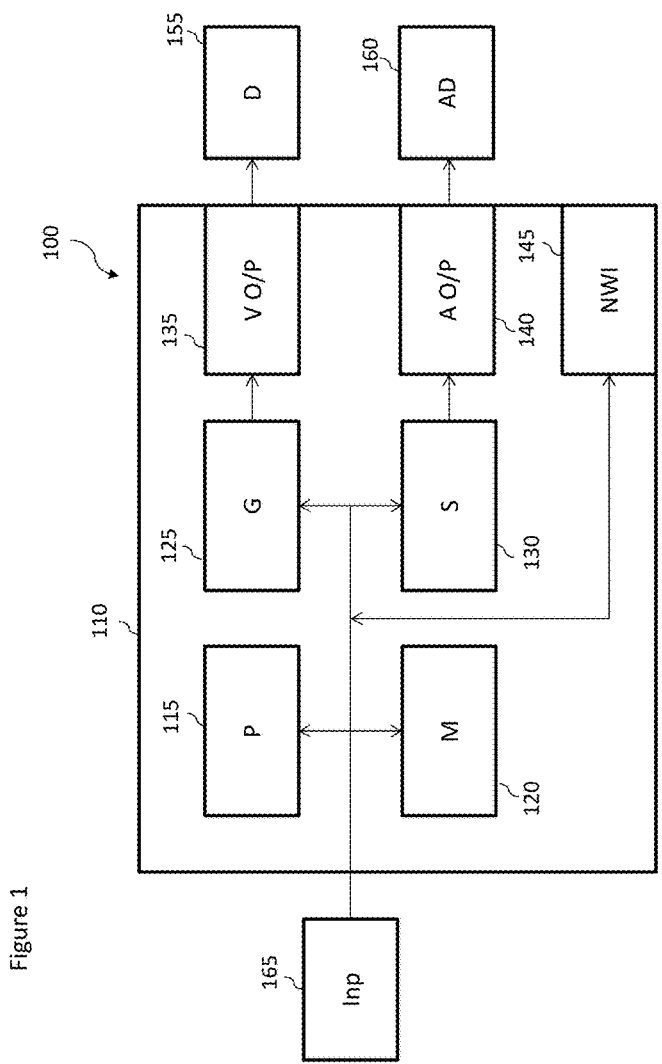
FIG. 1 shows an example device in which some embodiments may be provided.

A schematic view of a user or computing device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 is in the form of a touch sensitive device such as a touch screen. It should be appreciated that the display 155 may in some embodiments also provide the input device 165 by way of an integrated touch screen for example.

The blocks of the controller 110 are configured to communicate with each other via an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
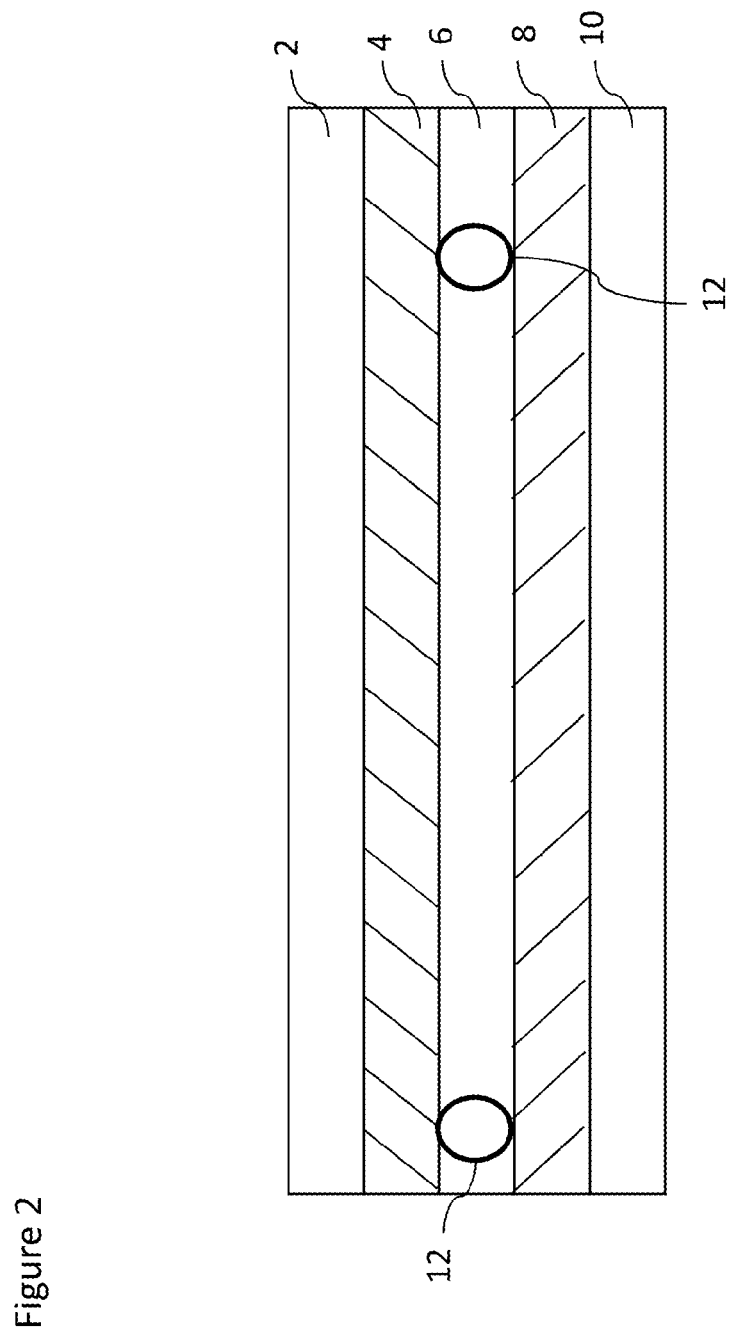
FIG. 2 shows a cross section of part of a touch screen display.
Figure 3:
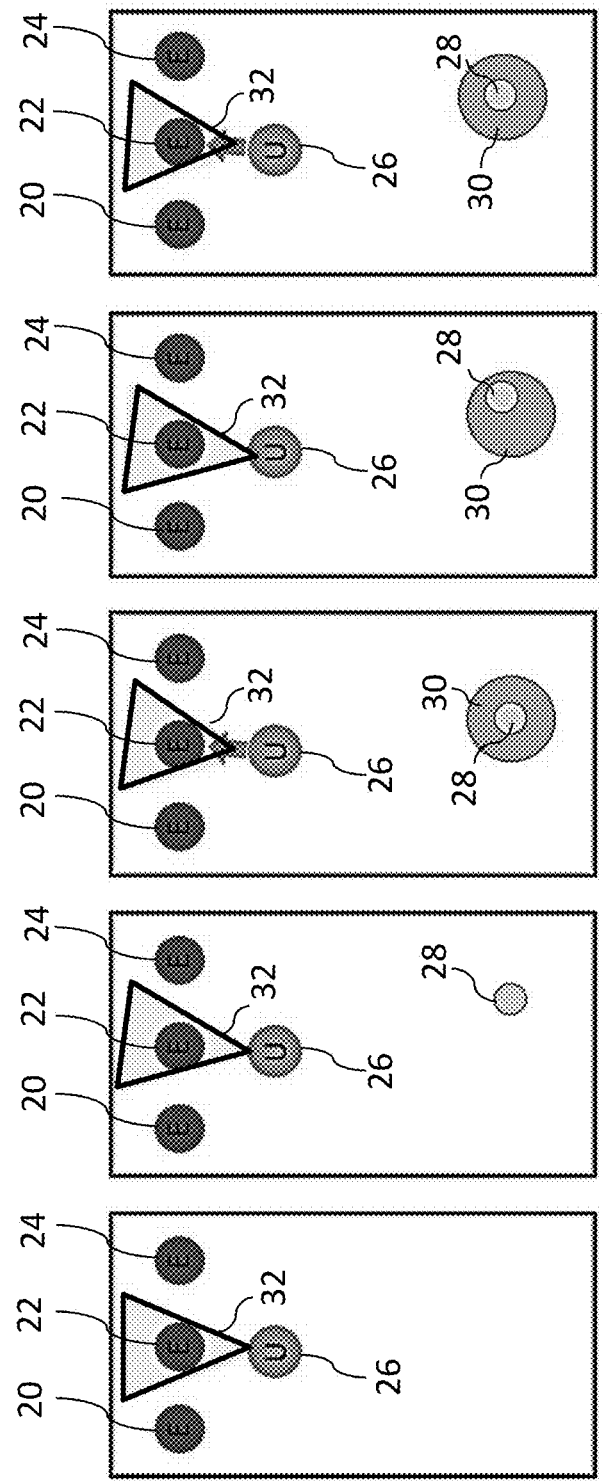
FIGS. 3a to 3e show schematically a first series of views of a touchscreen.

Reference is made to FIG. 2 which schematically shows a touch screen. The touch screen may incorporate any suitable touch screen technology. One example of a touch screen technology is the so-called resistive touch screen technology.

The front layer or surface 2 of the touch screen is typically made of a scratch-resistant, flexible plastic or similar. A thin film or coating 4 of conductive material is provided on the underside of the front surface. The film of conductive material can be of any suitable material and may for example be Indium Tin Oxide. A gap 6 is provided. This gap may be created by suitable spacers 12. The gap may be an air gap. A second layer of material is provided. That layer may be of glass or hard plastic. The second layer 10 is also provided with a thin film or coating 8 of conductive material on the side of the second layer facing the spacing. The coating may be of any suitable material and may also be Indium Tin Oxide. Thus, the two layers 2 and 10 are kept apart by the spacers 12 which may be arranged at regular intervals. The thin conductive films or coatings are arranged to provide electrical resistance. The arrangement is such that the electrical charge runs in one direction on the one conductive coating or film and in a perpendicular direction on the other conductive coating or film.

With a resistive touch screen, when the screen is touched, the plastic deforms so that the two conductive films meet. By measuring the resistance of the two conductive films or coatings, the touch position can be accurately determined.

It should be appreciated that this is one example of a touch screen. Another technology often used for touch screens is capacitive technology. The structure of the touchscreen is similar to that described in relation to FIG. 2. However, the first layer may typically be glass, and thus not flexible. The conductive coatings may be a uniform layer, a grid or parallel stripes running at right angles to each other on the two layers. A capacitive arrangement is formed by the two conductive coatings separated by the insulating material (air). When the finger comes close to a capacitor, it changes the local electrostatic field. The touchscreen effectively is made up of a large number of tiny capacitors. The system is arranged to monitor each of these tiny capacitors to determine where the finger touches the screen. Capacitive touch screens have the advantage that it is possible to determine several discrete touch points at the same time.

It should be appreciated that embodiments may be used with any suitable touch screen technology.

Embodiments may be particularly applicable for games which are to be played on devices which have a relatively small screen, such as smart phones and some smaller tablets. In such scenarios, a technical problem exists that the user has a problem in contacting a precise area on the small screen as the user's finger is relatively large relative to the screen. The contact location may control the selection of one more actions in a game. Subsequent interactions by the user are likely to be at a different location on the screen which may lead the user to inadvertently selecting the wrong option. If a user has to make a series of taps, the user contact with the screen may drift over time. With a small screen, this could lead to a different option being selected when the user is attempting to select the same option repeatedly.

Reference is now made to FIGS. 3a to e which shows a first embodiment. Each of the arrangements shown in FIG. 3 shows a schematic view of a touchscreen display which is displaying a plurality of game objects. One of the game objects 26 is a user controlled entity. Other of the game objects 20, 22 and 24 represent target objects.

In order to move the user controlled entity 26, the user will touch the touch screen at the location occupied by the user controlled entity and holding a finger against the touchscreen drag the user controlled entity to the new desired location.

In some embodiments, the user controlled entity may be moved by contacting the screen at any location, and without lifting the finger from the screen, moving the finger to anywhere on the screen. The user controlled entity will move in the same direction between the point first touched on the screen and the new "drag"-position.

The move velocity of the user controlled entity may be dependent on the distance between these points. There may be a maximum velocity.

The user controlled entity may continue to move until the user releases their finger from the screen.

In this embodiment, the user controlled entity 26 is to be controlled so as to aim at one of the target objects. The current aim area is illustrated schematically by the cone 32. The cone may be displayed on the screen or may not be displayed. Thus, the aim area of the user controlled entity is generally in the direction in which the user controlled entity is facing. The aim area may be a function of the direction of movement of that user controlled entity in some embodiments.

In the arrangement shown in FIG. 3b, the user has tapped the touchscreen at location 28. This location 28 may be displayed on the screen or may not be displayed. This location may be any location on the screen and in the example shown in FIG. 3b is remote from the position of the user controlled entity. However, it should be appreciated that the user can tap the touch screen at any suitable location. A tap is defined as the user making contact with the touch screen for a relatively short amount of time before lifting his finger away from the touch screen.

When the use taps the touchscreen, the user controlled entity will be controlled, for example, to fire at one or more of the target objects.

As shown in FIG. 3c as soon as the user has tapped the display, a threshold area 13 is defined around the location where the user tapped the screen. The threshold area is larger than the location of the screen which is tapped by the user.

The threshold area may be displayed on the screen or may not be displayed. Data defining the threshold area may be stored in memory.

As is shown in FIG. 3d, the user taps the screen again at a location 28. A determination is made as to whether or not this next tap is within the defined threshold area 30. If so, the user controlled entity continues to target the same target.

As shown in FIG. 3e, the target area is redefined so as to be centered on the latest tap area. This process is continued for as long as the user continues to tap within the threshold area.

In some embodiments the detected tap location may be determined/approximated as a contact point on the touchscreen. The contact point may coincide with a specific pixel. However, in other embodiments, there may not be a one to one relationship between respective contact point and a respective pixel. That contact point may be determined by an algorithm in dependence on the signal output from the touch screen.

The location may be defined as coordinates with respect to the touch screen surface and these coordinates may be used to determine whether the second tap is within the threshold area. The second tap location may also be defined as a contact point on the touchscreen.

When determining a contact point, the signal output is processed so as to define the contact point as the center point of the tap location. Defining a center of the tap location may make the defining of the threshold area simpler to determine. For example a circular threshold area may be easy to calculate, determine and/or to store in memory as it may be defined as a radius from such a determined point for a tap. The defining of a contact point for a tap may make it easier for the processor to determine if a subsequent tap is within the threshold area.

It should be appreciated that that the threshold area may be of any other suitable form or shape in other embodiments.

The threshold area may be defined about a tap area or a determined contact point. It is possible that the threshold area may be smaller than the contact area, larger than the contact area or around the same size.

Figure 4:
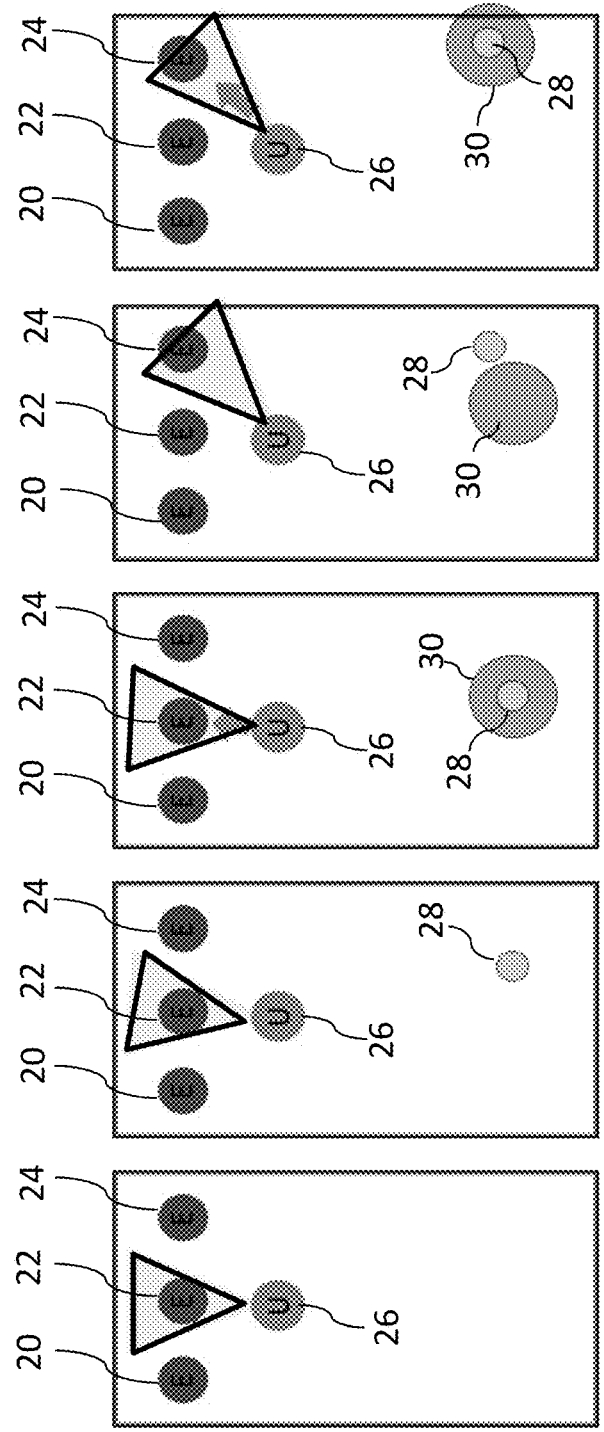
FIGS. 4a to 4e show schematically a second series of views of a touchscreen.

Reference is made to which shows a different scenario. FIGS. 4a to 4c are as described with reference to FIGS. 3a to c. In the scenario shown in FIG. 4d, the user taps the screen at a location which is outside the predefined threshold area 30. In response to this, the aim area of the user controlled entity is changed. The aim area will change in dependence on the current location of the tap as compared to the previous location of the tap.

As shown in FIG. 4e, the new threshold area 30 is defined around the latest tap location of the user.

Figure 5:
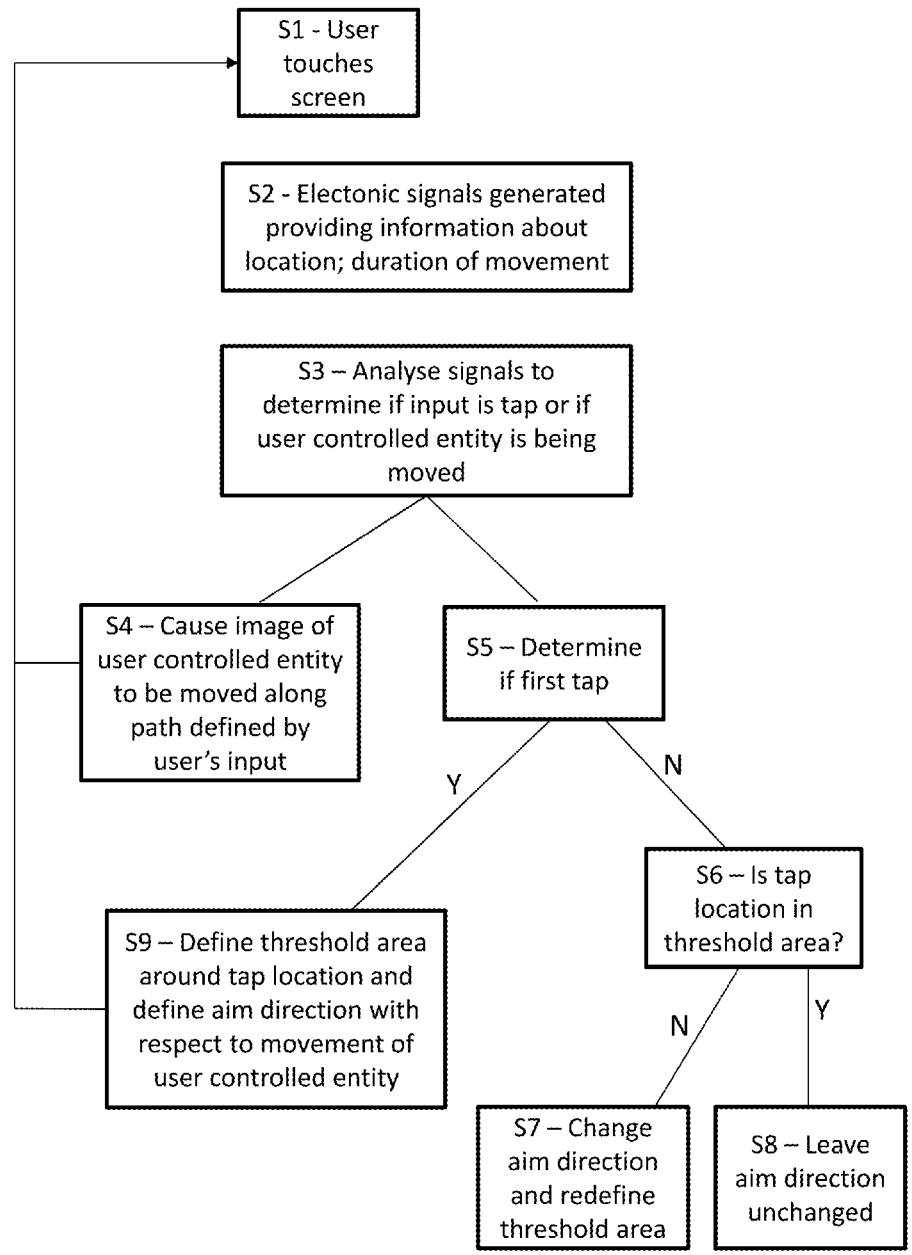
FIG. 5 shows an example flowchart according to an embodiment.

Reference is made to FIG. 5 which shows a method of an embodiment.

In step S1, the user touches the screen. As mentioned, this touch can take any suitable format and may comprise the user tapping the touchscreen or dragging their finger across the touchscreen in order to move the user controlled entity. It should be appreciated that the touch may be via a user's fingers or by using a stylus or the like. In some embodiments, the user will need to physically touch the touch screen in order to cause the interaction. In other embodiments, the user's interaction may need only to be in close proximity to the touchscreen in order to cause the interaction. It should be appreciated that the term "touch" is it intended to cover any or all of these scenarios which result in a user input being detected by the touchscreen.

In step S2, electrical signals will be generated by the touchscreen circuitry. This is as described for example in relation to FIG. 2. The electrical signals provide information as to the location where the user has touched the touchscreen, the duration of the touch and any movement.

The electrical signals are provided in step S3 to a processing function. The processing function may comprise one or more processers and optionally may include one or more signal processing entities. The signal processing function will analyze the signals to determine if the input is a tap or if the user's controlling the movement of a user controlled entity.

To determine if an input has been a tap, the processor is configured to determine the duration of the generated electronic signal. In some embodiments, the signal duration is compared to upper and lower signal duration thresholds. In some embodiments, either an upper signal duration or a lower signal duration threshold is used. The location of the tap may be taken into account. The one or more thresholds may be stored in memory. The comparison to the one or more thresholds may be performed by the processor running suitable computer executable code or may be performed by comparison circuitry.

The at least processor will determine the location of the user's input. The location of the user's touch on the touch screen is determined from the received electronic signals from the touch screen, as known in the art. It should be appreciated that the processing function may also use stored information as to the entity or entities being displayed on the display at the location associated with the touch input.

If an input is received over a period of time, and the location of the touch on the touchscreen is changing, then a determination may be made that the user controlled character is being moved. In some embodiments, this may be in conjunction with determining that the initial touch location is associated with a user controlled entity.

In step S4, if it is determined that the user controlled entity is being moved, then the image of the user controlled entity which is displayed on the display moves along a path defined by the user's input. Where a user controlled entity is determined to be moving, the path of the movement and/or the location of the user controlled entity may be stored in memory. In some embodiments, where a user controlled entity is determined to move, the location data of the user controlled entity may be updated in memory.

It should be appreciated that the method may continuously constantly loop between the steps S1 to S3 and the resulting subsequent steps.

It is determined in step S3 that the input provided by the user is a tap, then in step S5, it is determined if the tap is the first tap. This may be done by determining if there is current a threshold area and/or from the tap number which has been recorded. In some embodiments, the processor is configured to provide a count function every time there is a tap.

If the tap as a first tap, then the next step is step S9 and a threshold area is defined around the tap location. The aim direction will be defined with respect to the movement of the user controlled entity and/or the direction in which the user controlled entity is considered to face. The method may loop back to step S1.

If it is determined that the tap is not the first tap, then the next step is step S6. In this step, it is determined whether the tap location is within the previously defined threshold area associated with the preceding tap. The threshold area may be defined as an area on the screen. The determination will be made as to whether or not the tap is within the defined area. Data on the defined area would be stored in memory. The location of the tap would be determined and the processor will determine if the tap is within the defined area.

In some embodiments, the distance between the location of the current tap and the location of the previous tap is determined. If the distance is less than a threshold distance, then it is determined that the current tap is within the threshold area. In some embodiments, this may be carried out by determining the coordinates of the current tap location and the coordinates of the previous tap location and using this information to determine the distance between the two touch locations.

If the tap is within the threshold area, the next step is step S8 where the aim direction is left unchanged. The threshold area will be redefined around the current tap location. The method will then loop back to step S1.

If it is determined that the tap is not in the threshold area, the next step is step S7. The aim direction will be changed and a new threshold area is defined. It should be appreciated that the aim direction will take into account the difference in position between the previous tap and the current tap.

In one embodiment, the rate at which the user taps the screen may be determined. For example the time between one tap and the next may be determined. The size of the threshold distance or area may be determined in dependence on the determined time between taps. The threshold distance or area may be larger if the time between taps is relatively short. The threshold distance or area may be smaller if the time between taps is relatively long.

In some embodiments, the length of a tap may alternatively or additionally influence the threshold area. A longer tap may result in a smaller threshold area in some embodiments or vice versa.

In some embodiment, the time between a series of three or more successive taps may be determined to provide an average tap rate which is used to select or determine the appropriate threshold area or distance.

In the embodiments which use a threshold area, the threshold area has been defined as being substantially circular. However, in other embodiments, the threshold area may have any other suitable shape.

In embodiments, where the threshold area is not circular, account may need to be taken of distance and direction when determining if a successive tap is within a threshold area. For example, if the threshold area is square, then the possible distance between the tap locations (and still be in the threshold area) will vary depending on the direction of the subsequent tap with respect to the previous tap.

In some embodiments, a threshold are may be defined by a series of coordinates and it is determined if the successive tap location is within the area defined by coordinates. In some embodiments, the distance and direction between a tap location and a successive tap location may be determined and based on this information, it is determined if a successive tap is within a threshold area. This may be done in any suitable manner and may for example be done using a look up table or the like.

In some embodiments, the threshold area may be defined so as to exclude an area occupied by one or more game objects and/or to include an area occupied by one or more game objects.

In some embodiments, an aim of a computer implemented game may be to repeatedly tap within the threshold area. For example, the threshold area may be displayed on the display. The shape of the threshold area may be any suitable shape. In some embodiments, the shape of the threshold area may be selected to provide a challenge to the user. For example the threshold area may have a more complex shape such as a star shape or similarly complex shape.

In the above described embodiments, the action resulting from the tapping within the threshold area has been a firing action. It should be appreciated that in other embodiments, the action (resulting from tapping within or outside the threshold area) may be any other suitable action. For example, the action may be to cause selection of an object in a computer implemented game, selection of a character in a computer implemented game, selection of a game play option in a computer implemented game, selection of a characteristic of a game object; cause an object to move or any other suitable action. In some embodiments, the different action may be no action.

In some embodiments, an action may be defined by two components. The first component may be the action itself and a control component such as direction, strength of action or the like.

In some embodiments the action component may be the same regardless of whether the subsequent tap location is within or outside the threshold area but with direction or the other control component different if the subsequent tap is outside the threshold area.

In other embodiments, different actions may be performed depending on the location of the subsequent tap.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A device comprising:
a touch screen configured to display an image, said touch screen comprising circuitry configured to provide outputs dependent on inputs provided by a user via said touch screen;
a memory;
at least one processor configured,
to determine, in dependence on said outputs, locations of said inputs and when said inputs comprise a first tap input at a first location followed by a second tap input at a second location;
to determine when said second tap input is at said second location which is less than a first predefined distance from said first location of said first tap input,
wherein said at least one processor is configured to cause a first action responsive to the second tap input to be carried out, when it is determined that said second tap input is at said second location which is less than said first predefined distance from said first location;
wherein said at least one processor is configured to determine, when said input further comprises a third tap input following said second tap input, that said third tap input is at a third location which is less than a second predefined distance from said second location of said second tap input;
wherein said at least one processor is configured to cause said first action responsive to the third tap input to be carried out, when it is determined that said third tap input is at said third location which is less than said second predefined distance, wherein said first action is different to a second action which is caused in response to at least one of said second tap and said third tap being further than said respective predefined distance from the respective tap; and
wherein the at least one processor is configured, responsive to the first tap input, to define a first threshold area, said memory being configured to store information defining said first threshold area and responsive to the second tap input, said at least one processor is configured to redefine said first threshold area, said memory being configured to store information on said redefined threshold area.

2. A device as claimed in claim 1, wherein said first and second predefined distances are one of the same and different.

3. A device as claimed in claim 1, wherein said at least one processor is configured, to determine when said second tap input at said second location is less than the first predefined distance from the first location of said first tap input, said first predefined distance being dependent on a direction of the second tap with respect to the first tap.

4. A device as claimed in claim 1, wherein each of the threshold areas is substantially centred on said respective tap input.

5. A device as claimed in claim 1, wherein the at least one processor is configured to determine when said second tap input is at a location which is less than the first predefined distance from the location of said first tap input by determining when said second tap input is at a location within the first threshold area defined with respect to the first tap input.

6. A device as claimed in claim 1, wherein the at least one processor is configured to determine when said second tap input is at a location which is less than the first predefined distance from the location of said first tap input by determining the distance between the location of the first tap input and the location of the second tap input.

7. A device as claimed in claim 6, wherein at least one processor is configured to compare said determined distance to said first predefined distance to determine when said second tap input is at a location which is less than the first predefined distance from the location of the first tap input.

8. A device as claimed in claim 1, wherein the at least one processor is configured to determine time information between said first and second tap inputs, said first predefined distance being dependent on said time information.

9. A device as claimed in claim 1, wherein said device is configured to support a computer implemented game, said touch screen being configured to display a plurality of game objects, said at least one processor configured to cause said first action to be performed by at least one game object.

10. A device as claimed in claim 9, wherein said first action is defined by a first component and a second component, and said second action has at least one different first and second component.

11. A device as claimed in claim 10, wherein said first component of said first action and said second action defines an action and said second component comprises a direction, said direction being different in said first action and said second action.

12. A device as claimed in claim 1, wherein said at least one processor configured, in dependence on said outputs to determine locations of said inputs by determining for each input a contact point with respect to said touch screen.

13. A device as claimed in claim 1, wherein the at least one processor is configured to determine when said third tap input is at a location which is less than the second predefined distance from the location of said second tap input by determining when said third tap input is at a location within the redefined threshold area defined with respect to the second tap input.

14. A computer implemented method comprising:
displaying an image on a touch screen display; receiving outputs from touch screen circuitry responsive to inputs provided by a user via said touch screen display;
processing said outputs to determine locations of said inputs and when said inputs comprise a first tap input at a first location followed by a second tap input at a second location;
determining when said second tap input is at said second location which is less than a first predefined distance from said first location of said first tap input,
wherein said computer implemented method further comprising causing a first action responsive to the second tap input to be carried out, when it is determined that said second tap input is at said second location which is less than said first predefined distance from said first location;
wherein said computer implemented method further comprising, determining, when said input further comprises a third tap input following said second tap input, when said third tap input is at a third location which is less than a second predefined distance from said second location of said second tap input;
wherein said computer implemented method further comprising, causing said first action responsive to the third tap input to be carried out, when it is determined that said third tap input is at said third location which is less than said second predefined distance, wherein said first action is different to a second action which is caused in response to at least one of said second tap and said third tap being further than said respective predefined distance from the respective tap; and wherein said computer implemented method further comprises, responsive to the first tap input, defining a first threshold area, storing information in a memory defining said first threshold area, responsive to the second tap input, redefining said first threshold area, and storing information on said redefined threshold area.

15. A non-transitory computer readable medium storing a computer program for a computer implemented game in a touch screen device, said computer program when run causing a computer to:
cause an image to be displayed on a touch screen display;
process outputs from touch screen circuitry responsive to inputs provided by a user via said touch screen display;
determine locations of said inputs from said outputs and when said inputs comprise a first tap input at a first location followed by a second tap input at a second location;
determine when said second tap input is at said second location which is less than a first predefined distance from said first location of said first tap input,
wherein said computer program when run causes a first action responsive to the second tap input to be carried out, when it is determined that said second tap input is at said second location which is less than said first predefined distance;
wherein said computer program when run determines, when said input further comprises a third tap input following said second tap input, when said third tap input is at a third location which is less than a second predefined distance from said second location of said second tap input;
wherein said computer program when run causes said first action responsive to the third tap input to be carried out when it is determined that said third tap input is at said third location which is less than said second predefined distance, wherein said first action is different to a second action which is caused in response to at least one of said second tap and said third tap being further than said respective predefined distance from the respective tap; and
wherein said computer when run, responsive to the first tap input, defines a first threshold area, stores information in a memory defining said first threshold area, responsive to the second tap input, redefines said first threshold area, and stores information on said redefined threshold area.

16. A device comprising:
a touch screen configured to display an image, said touch screen comprising circuitry configured to provide outputs dependent on inputs provided by a user via said touch screen;
a memory;
at least one processor configured,
to determine, in dependence on said outputs, locations of said inputs and when said inputs comprise a first tap input at a first location followed by a second tap input at a second location;
responsive to the first tap input, to define a first threshold area, said memory being configured to store information defining said first threshold area;
to determine when said second tap input is at said second location within said first threshold area wherein said at least one processor is configured to cause a first action responsive to the second tap input to be carried out, when it is determined that said second tap input is at said second location within said first threshold area;
responsive to the second tap input,
redefining said first threshold area, said memory being configured to store information on said redefined threshold area;
wherein said at least one processor is configured to determine, when said input further comprises a third tap input following said second tap input, when said third tap input is at a third location within said redefined threshold area;
wherein said at least one processor is configured to cause said first action responsive to the third tap input to be carried out, when it is determined that said third tap input is at said third location within said redefined threshold area, wherein said first action is different to a second action which is caused in response to at least one of said second tap and said third tap being outside the respective threshold area.

* * * * *